(12) United States Patent
Stattin et al.

(10) Patent No.: US 11,457,495 B2
(45) Date of Patent: *Sep. 27, 2022

(54) METHODS OF RESUMING A RADIO BEARER AND RELATED WIRELESS TERMINALS AND NETWORK NODES

(71) Applicant: Telefonaktiebolaget LM Ericsson (publ), Stockholm (SE)

(72) Inventors: Magnus Stattin, Upplands Väsby (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

This patent is subject to a terminal disclaimer.

(21) Appl. No.: 16/936,674

(22) Filed: Jul. 23, 2020

(65) Prior Publication Data

US 2020/0351972 A1 Nov. 5, 2020

Related U.S. Application Data

(63) Continuation of application No. 16/094,935, filed as application No. PCT/SE2017/050526 on May 18, 2017, now Pat. No. 10,764,953.

(Continued)

(51) Int. Cl.
*H04W 76/19* (2018.01)
*H04L 9/40* (2022.01)
(Continued)

(52) U.S. Cl.
CPC .......... *H04W 76/19* (2018.02); *H04L 63/061* (2013.01); *H04W 12/50* (2021.01); *H04L 5/001* (2013.01);
(Continued)

(58) Field of Classification Search
CPC ... H04W 76/19; H04W 12/003; H04W 80/02; H04W 40/24; H04W 80/08;
(Continued)

(56) References Cited

U.S. PATENT DOCUMENTS 9,295,095 B2  3/2016  Rayavarapu
10,219,193 B2  2/2019  Kim et al.
(Continued)

FOREIGN PATENT DOCUMENTS

CN  105210410 A  12/2015
CN  105557006 A  5/2016
(Continued)

OTHER PUBLICATIONS

"LTE RAN impacts to enable CIoT UP solution", 3GPP TSG RAN WG2 Meeting #93; R2-161266; St. Julian's, Malta, Feb. 15-19, 2016, pp. 1-13.
(Continued)

*Primary Examiner* — Brian T O Connor
(74) *Attorney, Agent, or Firm* — Murphy, Bilak & Homiller, PLLC

(57) ABSTRACT

Embodiments include methods for a wireless terminal (UE) configured to operate in a wireless communication network that includes a base station. Such methods include transmitting, to the base station, a request to resume a suspended connection with the wireless communication network; and subsequently receiving, from the base station, a connection resume message. Such methods also include performing configuration of the connection based on the connection resume message, including changing a security key previously used for the connection before the connection was suspended. Such methods also include resuming a suspended radio bearer associated with the connection and selectively transmitting, to the base station, a connection
(Continued)

resume complete message. Other embodiments include complementary methods for a base station, as well as wireless terminals (UEs) and base stations configured to perform such methods.

20 Claims, 13 Drawing Sheets

Related U.S. Application Data

(60) Provisional application No. 62/338,399, filed on May 18, 2016.

(51) Int. Cl.
| | | |
|---|---|---|
| *H04W 12/50* | (2021.01) | |
| *H04W 74/08* | (2009.01) | |
| *H04W 76/15* | (2018.01) | |
| *H04W 8/08* | (2009.01) | |
| *H04W 72/04* | (2009.01) | |
| *H04W 36/00* | (2009.01) | |
| *H04W 36/08* | (2009.01) | |
| *H04W 80/02* | (2009.01) | |
| *H04L 5/00* | (2006.01) | |
| *H04L 69/22* | (2022.01) | |
| *H04W 40/24* | (2009.01) | |
| *H04W 80/08* | (2009.01) | |

(52) U.S. Cl.
CPC ............ *H04L 69/22* (2013.01); *H04W 8/08* (2013.01); *H04W 36/0033* (2013.01); *H04W 36/08* (2013.01); *H04W 40/24* (2013.01); *H04W 72/0446* (2013.01); *H04W 72/0453* (2013.01); *H04W 74/0833* (2013.01); *H04W 76/15* (2018.02); *H04W 80/02* (2013.01); *H04W 80/08* (2013.01)

(58) Field of Classification Search
CPC ... H04W 74/0833; H04W 76/15; H04W 8/08; H04W 72/0446; H04W 36/0033; H04W 36/08; H04W 72/0453; H04W 4/70; H04W 76/27; H04W 12/04; H04L 63/061; H04L 5/001; H04L 69/22
See application file for complete search history.

(56) References Cited

U.S. PATENT DOCUMENTS

| | | | |
|---|---|---|---|
| 10,764,937 B2* | 9/2020 | Kim | H04W 76/10 |
| 10,764,953 B2* | 9/2020 | Stattin | H04W 76/19 |
| 11,064,554 B2* | 7/2021 | Uchino | H04W 76/25 |
| 2004/0131026 A1 | 7/2004 | Kim et al. | |
| 2015/0163705 A1 | 6/2015 | Lu et al. | |
| 2016/0191471 A1 | 6/2016 | Ryoo et al. | |
| 2017/0171752 A1 | 6/2017 | Lee et al. | |
| 2019/0020998 A1 | 1/2019 | Takahashi et al. | |
| 2019/0037629 A1 | 1/2019 | Ryu et al. | |
| 2019/0045572 A1 | 2/2019 | Kim et al. | |
| 2019/0059119 A1 | 2/2019 | Hapsari et al. | |
| 2019/0116483 A1 | 4/2019 | Ryu et al. | |
| 2019/0158997 A1 | 5/2019 | Starsinic et al. | |
| 2020/0015288 A1* | 1/2020 | Feng | H04W 76/10 |

FOREIGN PATENT DOCUMENTS

| | | |
|---|---|---|
| EP | 1401152 A2 | 3/2004 |
| JP | 2004274706 A | 9/2004 |
| WO | 2015142048 A1 | 9/2015 |
| WO | 2016068776 A1 | 5/2016 |

OTHER PUBLICATIONS

"Resumption of S1 with an S1AP NAS Transport procedure", 3GPP TSG-RAN WG3 Meeting #91bis; R3-160870; Bengaluru, India, Apr. 11-15, 2016, pp. 1-3.
"Summary of email discussion: [NBAH#04][NBIOT/Resume] RRC Functions for suspend-resume", 3GPP TSG-RAN WG2 Meeting #93; R2-161166; St. Julian's, Malta, Feb. 15-19, 2016, pp. 1-26.
"3GPP TR 23.720 V1.2.0"; 3rd Generation Partnership Project; Technical Specification Group Services and System Aspects; Architecture enhancements for Cellular Internet of Things (Release 13), Nov. 2015, pp. 1-96.
"ETSI TS 123 401 v13.6.1", LTE; General Packet Radio Service (GPRS) enhancements for Evolved Universal Terrestrial Radio Access Network (E-UTRAN) access (3GPP TS 23.401 version 13.6.1 Release 13), May 2016, pp. 1-367.
"Mobile Broadband Evolution Towards 5G: Rel-12 & Rel-13 and Beyond", 4G Americas, Jun. 2015, pp. 1-209.
"RRC Connection Suspend and Resume", 3GPP TSG-RAN WG2 NB-IOT Ad-hoc Meeting; Tdoc R2-160475 Budapest, Hungary, Jan. 19-21, 2018, pp. 1-14.
"Security aspects of NB-IoT", 3GPP TSG-RAN WG2 NB-IOT Ad-hoc Meeting; Tdoc R2-160476; Budapest, Hungary, Jan. 19-21, 2016, pp. 1-4.

* cited by examiner

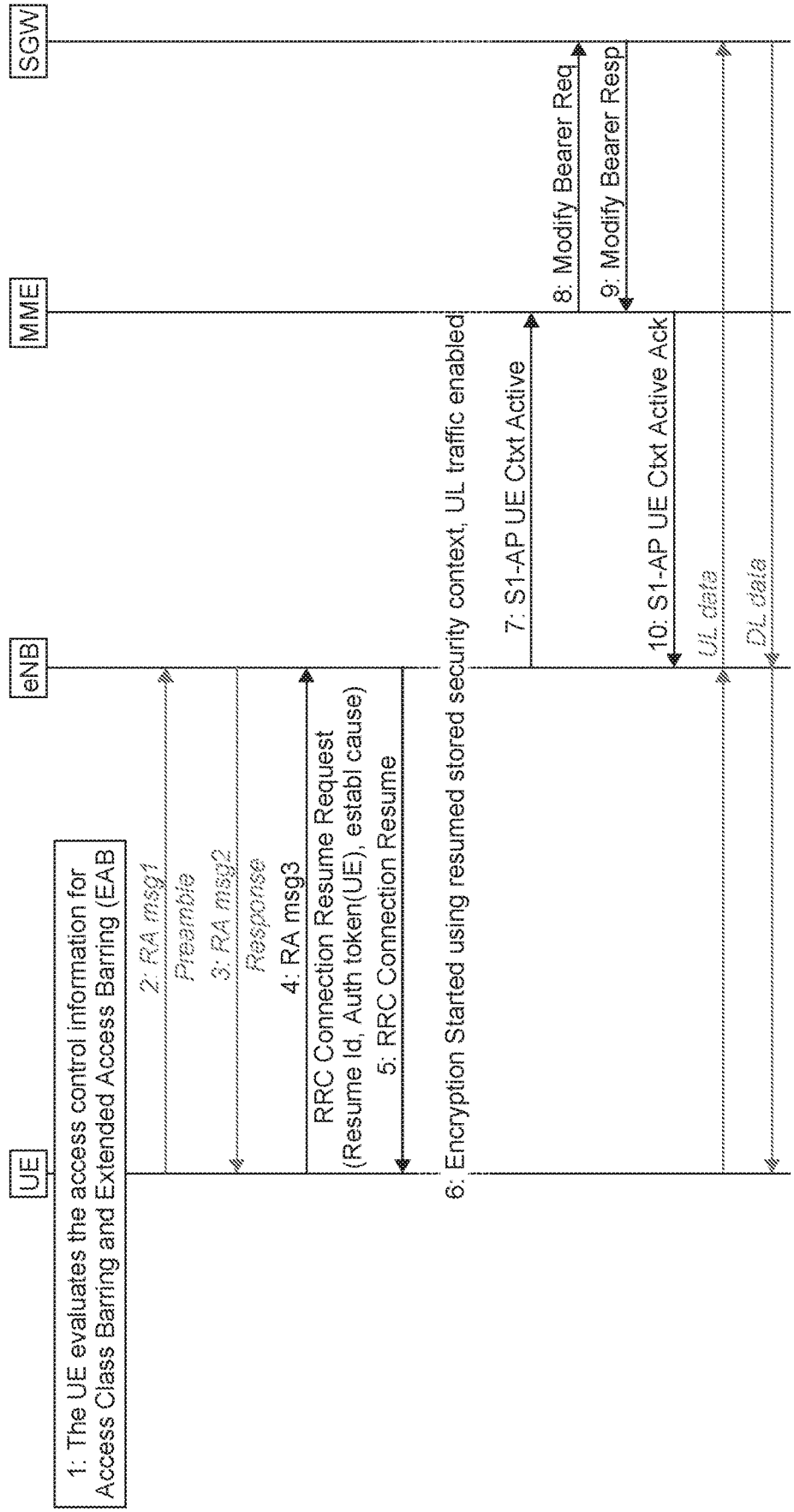
Figure 3 – Resumption of a Previously Suspended RRC Connection

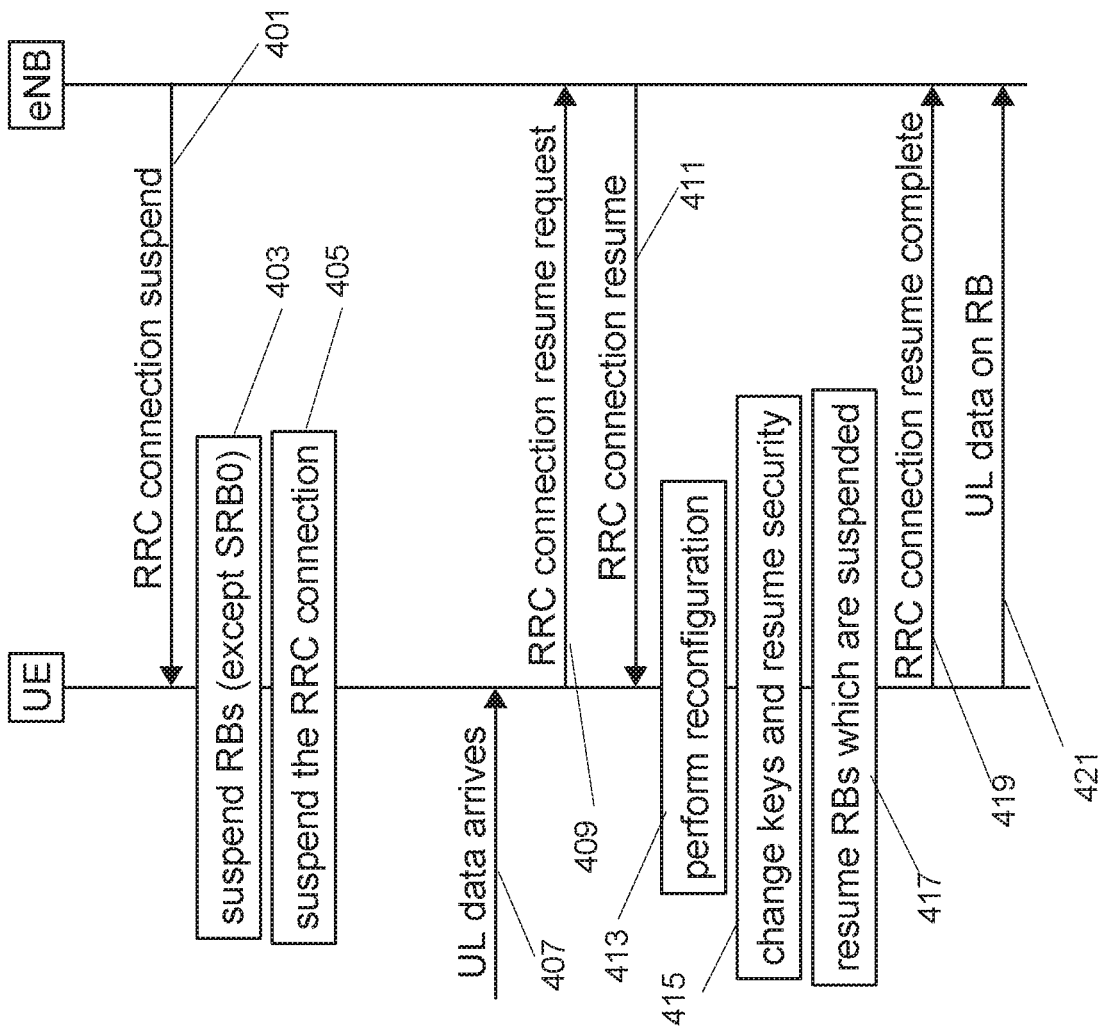

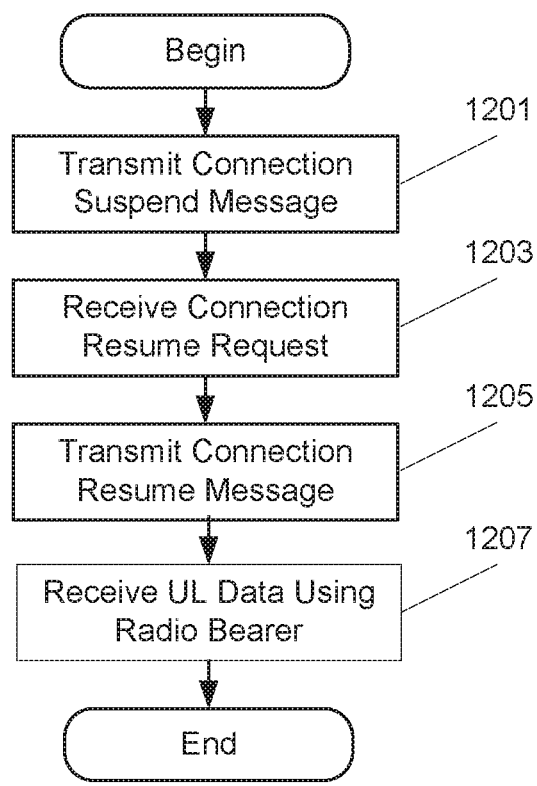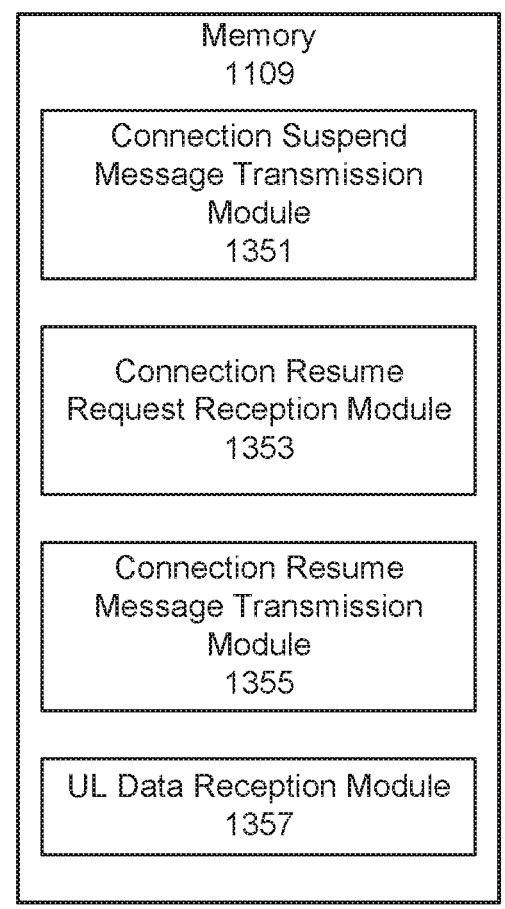

METHODS OF RESUMING A RADIO BEARER AND RELATED WIRELESS TERMINALS AND NETWORK NODES

CROSS-REFERENCE TO RELATED APPLICATION(S)

This application is a continuation of, and claims the benefit of priority from, U.S. patent application Ser. No. 16/094,935 filed on Oct. 19, 2018, which is a U.S. national-stage application claiming priority to international application PCT/SE2017/050526 filed on May 18, 2017, which claims the benefit of U.S. Provisional Patent Application 62/338,399 filed on May 18, 2016. The entire disclosures of the above-mentioned applications are incorporated herein by reference for all purposes.

TECHNICAL FIELD

The present disclosure relates to the field of communications, and more particularly to methods providing wireless communications and related wireless terminals and network nodes.

BACKGROUND

An aspect of LTE operation is for the UE to signal as little as possible while not having any data to send or receive; to use as little power as possible. One way to do so is for the UE to remain in RRC_IDLE while not sending any data. Before each transmission the UE may need to switch state to RRC_CONNECTED; a procedure that involves exchanging a number of messages between the UE and the eNB. Remaining in RRC_IDLE may be efficient for this purpose as long as the UE remains fairly stationary, i.e., the UE does not have to perform measurements on other neighboring cells. Hence, fast switch to RRC_IDLE may be particularly efficient for MTC (Machine Type Communication) devices that are not expected to move.

Further power reduction may be provided by suspending and resuming an RRC connection. With known suspending and resuming of RRC connections, an incorrect or unsupported configuration may be used when a connection is resumed resulting in lost data, malfunction, and/or unexpected behavior.

SUMMARY

According to some embodiments of inventive concepts, methods may be provided to operate a wireless terminal in a wireless communication network. A connection resume request may be transmitted from the wireless terminal to a base station of the wireless communication network, and after transmitting the connection resume request, a connection resume message may be received at the wireless terminal from the base station. Responsive to receiving the connection resume message, reconfiguration of a connection with the base station may be performed, a security key for the connection with the base station may be provided, and a radio bearer may be resumed. After resuming the radio bearer, uplink data may be transmitted using the radio bearer.

According to some other embodiments of inventive concepts, a wireless terminal may include a transceiver configured to provide wireless communication with a wireless communication network, and a processor coupled with the transceiver. Communications between the processor and the wireless communication network may be provided through the transceiver. The processor may be configured to transmit a connection resume request from the wireless terminal to a base station of the wireless communication network, and to receive a connection resume message at the wireless terminal from the base station after transmitting the connection resume request. Responsive to receiving the connection resume message, the processor may be configured to perform reconfiguration of a connection with the base station, provide a security key for the connection with the base station, and resume a radio bearer. In addition, the processor may be configured to transmit uplink data using the radio bearer after resuming the radio bearer.

According to still other embodiments of inventive concepts, a wireless terminal may be provided for operation in a wireless communication network. The wireless terminal may be adapted to transmit a connection resume request from the wireless terminal to a base station of the wireless communication network and to receive a connection resume message at the wireless terminal from the base station after transmitting the connection resume request. Responsive to receiving the connection resume message, the wireless terminal may be adapted to perform reconfiguration of a connection with the base station, provide a security key for the connection with the base station, and resume a radio bearer. The wireless terminal may also be configured to transmit uplink data using the radio bearer after resuming the radio bearer.

According to yet other embodiments of inventive concepts, methods may be provided to operate a node of a wireless communication network. A connection suspend message may be transmitted from the node to a wireless terminal. After transmitting the connection suspend message, a connection resume request may be received at the node from the wireless terminal. Responsive to receiving the connection resume request, a connection resume message may be transmitted from the node to the wireless terminal, wherein the connection resume message includes an indication to delay resuming a radio bearer of the connection.

According to further embodiments of inventive concepts, a node of a wireless communication network may include a transceiver configured to provide wireless communication with a wireless terminal, and a processor coupled with the transceiver. Communications between the processor and the wireless terminal may be provided through the transceiver. The processor may be configured to transmit a connection suspend message from the node to a wireless terminal, and to receive a connection resume request at the node from the wireless terminal after transmitting the connection suspend message. The processor may be further configured to transmit a connection resume message from the node to the wireless terminal responsive to receiving the connection resume request, and the connection resume message may include an indication to delay resuming a radio bearer of the connection.

According to more embodiments of inventive concepts, a node of a wireless communication network may be provided. The node may be adapted to transmit a connection suspend message from the node to a wireless terminal, and to receive a connection resume request at the node from the wireless terminal after transmitting the connection suspend message. In addition, the node may be adapted to transmit a connection resume message from the node to the wireless terminal responsive to receiving the connection resume request, and the connection resume message may include an indication to delay resuming a radio bearer of the connection.

According to some embodiments disclosed herein, a likelihood of configuration mismatch between a wireless device and a base station may be reduced when a suspended connection/bearer is resumed.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a message diagram illustrating resumption of a previously suspended RRC connection;

FIGS. 4A, 4B, 5, 6, and 7 are message diagrams illustrating operations of suspending and resuming RRC connections according to some embodiments of inventive concepts;

FIG. 12 is a flow chart illustrating operations of a network node according to some embodiments of inventive concepts; and FIG. 13 is a block diagram of memory modules related to operations of FIG. 12 according to some embodiments of inventive concepts.

DETAILED DESCRIPTION

Figure 1A:
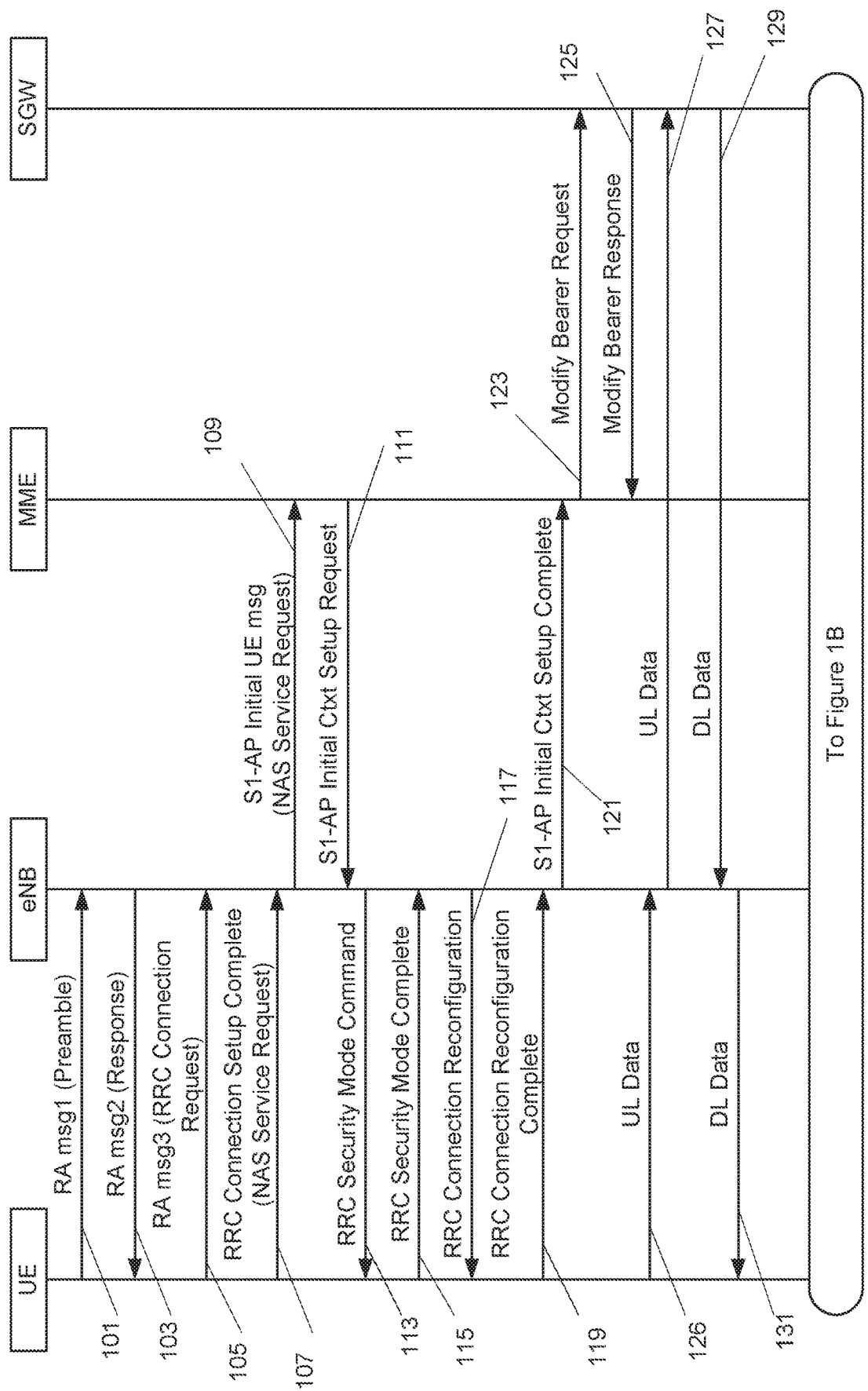
FIGS. 1A and 1B together illustrate S1/EPS architecture based procedures applicable at UE Idle/Connected state transition.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although various embodiments are disclosed herein in the context of being performed by a UE and/or a network node, they are not limited thereto and instead can be performed in any type of electronic communication device or system.

Note that although terminology from LTE is generally used in this disclosure to exemplify embodiments of inventive concepts, this should not be seen as limiting the scope of inventive concepts to only these systems. Other wireless systems, including variations and successors of 3GPP LTE and WCDMA systems, WiMAX (Worldwide Interoperability for Microwave Access), 1 MB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNB, eNodeB, or Evolved Node B) and wireless terminal or mobile terminal (also referred to as User Equipment, User Equipment node, or UE) should be considered as non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel.

Assuming that UEs (also referred to as user equipment, user equipment nodes, wireless terminals, etc.) are fairly stationary, to further save or reduce power consumption one could consider reducing the amount of signaling needed to execute the state transition from RRC_IDLE to RRC_CONNECTED.

One such approach currently being standardized is RRC (Radio Resource Control) connection suspend and resume. The RRC connection suspend and resume approach for UP (User Plane) based data transfer may reduce the signaling overhead required for UE state transition from the IDLE to CONNECTED in order to have a user plane transaction with the network and back to IDLE state on the radio interface from 10 down to 5 messages and on the S1AP from 6 down to 4 messages. The solution impacts the AS and the NAS layer. The reduced signaling may also improve UE battery lifetime.

The signaling overhead reduction may be realized by introducing two new procedures 'RRC connection suspend' and 'RRC connection resume' that are described herein and the introduction of a modified UE behavior in RRC_IDLE where relevant AS information is stored at transition to RRC_IDLE. Storing of parameters is triggered by a RRC connection suspend procedure, and parameters are re-used by the UE for a subsequent connection setup.

Signaling in LTE

Contributors to the signaling overhead are procedures used in current S1-based EPS architecture used/required for UE state transition, i.e. at transition between the Idle and the Connected state.

Figure 1B:
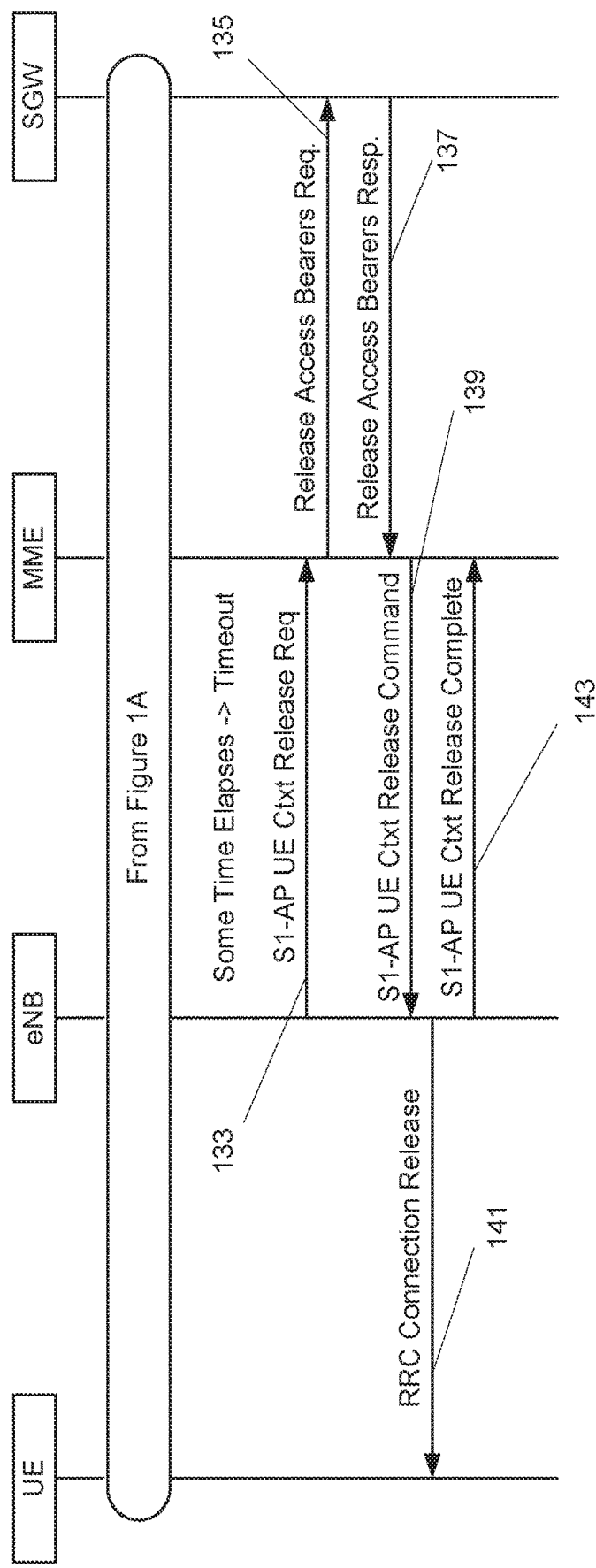

FIGS. 1A and 1B together illustrate current S1/EPS architecture based procedures used to establish and tear down a connection in order for the UE to be able to transfer/receive user plane information, i.e. procedures applicable at UE Idle/Connected state transition. As can be seen, there may be significant signaling overhead on the radio/Uu, S1AP interface. In order to reduce the signaling overhead and the associated processing load in the network, a solution is introduced in Rel-13 that allows an RRC Connection to be suspended and at a later time resumed; reducing/minimizing the need to go through the full signaling procedure for IDLE to CONNECTED state transition.

As shown in FIG. 1A, wireless terminal UE and base station eNB may perform a random access (RA) procedure. At operation 101, wireless terminal UE may transmit an RA msg1 (preamble), at operation 103, base station eNB may respond with an RA msg2 (Response), and at operation 105, wireless terminal UE may transmit an RA msg3 (RRC Connection Request). At operation 107, wireless terminal UE may transmit an RRC Connection Setup Complete message (NAS Service Request) to base station eNB. In response to the RRC Connection Setup Complete message, base station eNB may transmit an S1-AP Initial UE message (NAS Service Request) to MME (Mobility Management Entity) at operation 109, and MME may respond with an S1-AP Initial Ctxt Setup Request at operation 111.

At operation 113, base station eNB may transmit an RRC Security Mode Command message to wireless terminal UE, at operation 115, wireless terminal UE may transmit an RRC Security Mode Complete message to base station eNB, at operation 117, base station eNB may transmit an RRC Connection Reconfiguration message to wireless terminal UE, and at operation 119, wireless terminal UE may transmit an RRC Connection Reconfiguration Complete message to base station eNB. At operation 121, base station eNB may transmit an S1-AP Initial Ctxt Setup Complete message to MME, at operation 123, MME may transmit a Modify Bearer Request message to SGW (Serving Gateway), and at operation 125, SGW may transmit a Modify Bearer Response message to MME. At operations 126 and 127, wireless terminal UE may transmit uplink UL data through base station eNB to SGW, and at operations 129 and 131, SGW may transmit downlink DL data through base station eNB to wireless terminal UE.

At operation 133 (shown in FIG. 1B) after a timeout, base station eNB may transmit an S1-AP UE Ctxt Release Request message to MME, and MME may transmit a Release Access Bearers Request to SGW at operation 135. At operation 137, SGW may transmit a Release Access Bearers Response message to MME, and at operation 139, MME may transmit an S1-AP UE Ctxt Release Command message to base station eNB. Base station eNB may then transmit an RRC Connection Release message to wireless terminal UE at operation 141, and base station eNB may transmit an S1-AP UE Ctxt Release Complete message to MME at operation 143.

Initial connection and AS context setup will now be discussed.

A UE may need to perform an initial connection setup to establish the NAS signaling connection and provide the UE and network with an initial AS context, as shown in FIGS. 1A and 1B. The NAS layer is aware that subsequently no Service Requests are required as long as a valid AS context in the network is found by the AS layer. If for any reason the AS layer context is missing in the network while the UE attempts a resume procedure, the resume procedure fails and the AS layer triggers a NAS Layer Service Request to establish a new initial AS layer context.

RRC connection suspend procedure will now be discussed.

The RRC connection suspend procedure is used at transition from RRC_CONNECTED to RRC_IDLE state and causes the UE to retain the AS context in RRC_IDLE mode:
  the eNodeB (also referred to as an eNB, or a base station) and the UE store RRC connection related information, AS Security Context, bearer related information (incl. RoHC state information) and other L3/2/1 parameters when applicable. The eNB provides the UE with an identifier, referred as 'Resume ID', used to address the relevant information stored in the eNB.
  Relevant network nodes store S1-MME UE association and S1-U bearer context related information. This basically means that the S1AP UE Contexts are stored and kept in the eNB and the MME. Additionally, the eNB stores and keeps the S1-U tunnel addresses. The latter reduces the processing load on the eNB required for establishment of S1-U bearers.
  UE's mobility behavior is the same as in RRC_IDLE state, e.g. the UE applies normal or extended IDLE mode DRX (Discontinuous Reception) parameters, performs cell re-selection, etc.
  At transition to RRC_IDLE, the NAS layer in the UE enters ECM-IDLE state.

Figure 2:
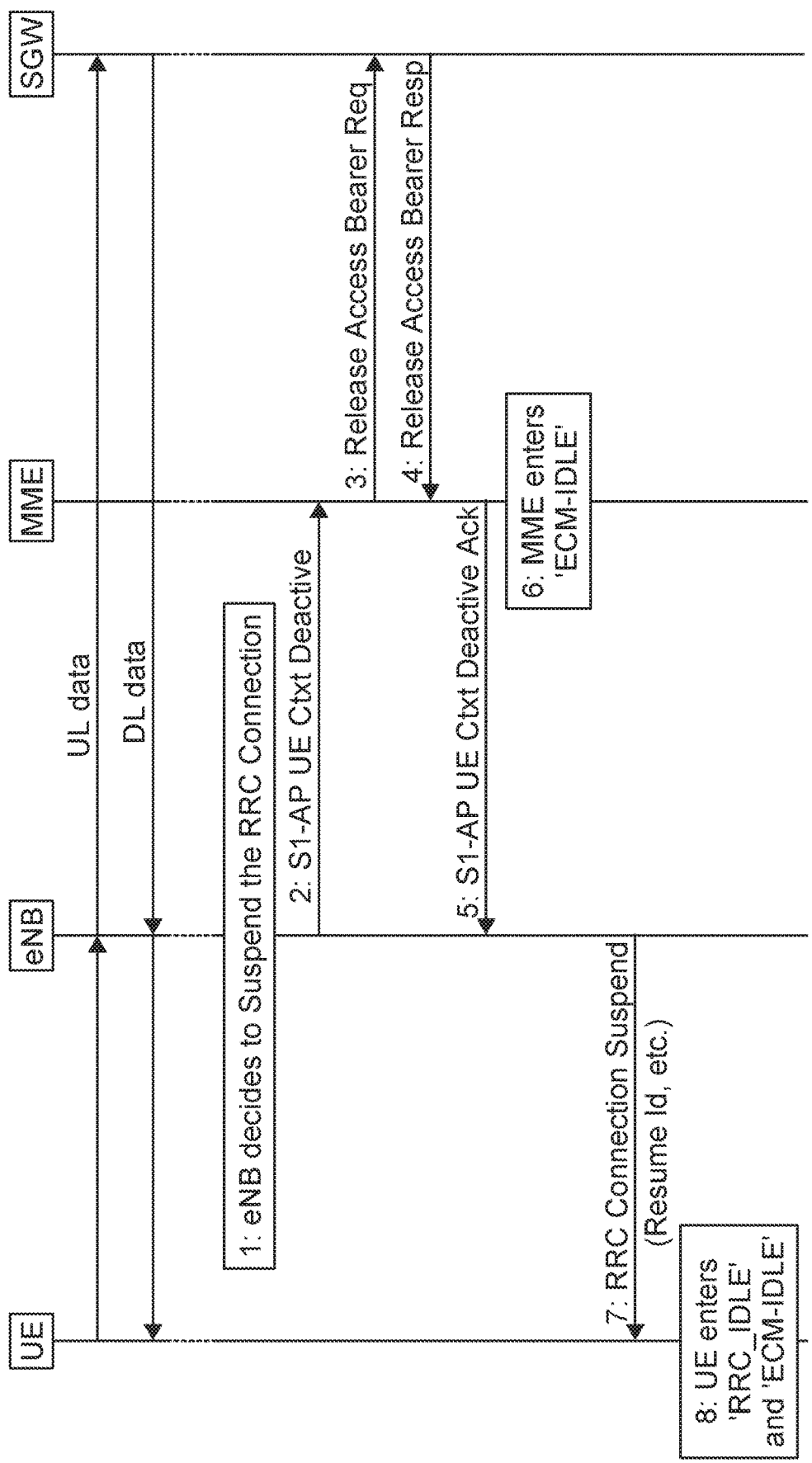
FIG. 2 is a message diagram illustrating suspension of a RRC connection.

FIG. 2 illustrates suspension of a RRC connection as discussed in greater detail below with respect to operations/messages of FIG. 2.
  Operation 1 of FIG. 2. Network decides to suspend the RRC Connection.
  Message 2 of FIG. 2. eNB indicates to MME with a new S1AP message that the UE's RRC connection is suspended. MME and eNB store the S1AP association and the related UE Contexts. MME enters ECM state ECM-IDLE. MME stores the DL TEIDs associated with the UE and eNodeB.
  Message 3 of FIG. 2. The MME sends a Release Access Bearers Request (Abnormal Release of Radio Link Indication or 'new cause') message to the S-GW (Serving Gateway) that requests the release of all S1-U bearers for the UE. SGW considers UE being in Idle state.
  Message 4 of FIG. 2. SGW provides a response to the step 3.
  Message 5 of FIG. 2. MME Acks step 2.
  Operation 6 of FIG. 2. MME enters 'ECM-IDLE' state.
  Message 7 of FIG. 2. eNB suspends the RRC Connection towards the UE. An identifier that is used at subsequent resumption of that suspended RRC Connection can be provided. The UE and the eNB store the related context information, i.e. RRC configuration, AS security context, bearer related configuration (including RoHC state information), and other L3/2/1 parameters when applicable. This message may also contain the Next Hop Chaining Counter (NCC) associated with the K_eNB that is to be used at subsequent resumption. Other information may also be provided/included.
  Operation 8 of FIG. 2. The UE RRC layer enters RRC_IDLE state where it stores the relevant AS information (see step 7) and the UE NAS layer enters ECM-IDLE state where it is aware that a NAS signaling connection is available.

An RRC connection resume procedure will now be discussed.

At the transition from RRC_IDLE to RRC_CONNECTED, previously stored information in the UE as well as in the eNodeB is utilized to resume the RRC connection. The UE provides the previously received 'Resume ID' to be used by the eNB to access the stored information used/required to resume the RRC Connection. Furthermore, it provides an Authentication Token used to securely identify the UE.

Relevant network nodes re-store/re-use S1-MME UE S1AP association and S1-U bearer context related information.

Given that NAS layer is aware that the initial connection was setup, no NAS Service Request will be issued and thus there is no need for RRC Connection Setup Complete message to carry that message.

The reduction of signaling overhead may be from 9 messages on the radio interface for legacy connection setup as shown in FIGS. 1A and 1B down to 4 messages when using RRC Connection Resume procedure as shown in the FIG. 3. The omitted/removed messages are:
  RRC Connection Setup Complete
  RRC Security Mode Command
  RRC Security Mode Complete RRC Connection Reconfiguration RRC Connection Reconfiguration Complete The procedure is illustrated in FIG. 3.

FIG. 3 illustrates Resumption of a previously suspended RRC connection. Operations 1, 2, and 3 of FIG. 3 may follow legacy operations when the UE accesses the network from RRC Idle state.

Operation 4 of FIG. 3. In msg3, a new RRC Connection Resume Request message (carried over SRB0/CCCH) is transmitted/received, in which the UE includes its Resume Id, Authentication Token, and Establishment Cause. eNB uses Resume Id to associate the UE with the previously stored UE Context.

Operation 5 of FIG. 3. In message 4, designated here as RRC Connection Resume, the network among provides, e.g., updated L3/2/1 parameters, if applicable.

Operation 6 of FIG. 3. UE and eNB resume the stored security context.

Operation 7 of FIG. 3. eNB notifies the MME about UE state change in a new S1AP message designated here as S1-AP UE Context Active. ECM in the MME enters the ECM-CONNECTED state. MME identifies that the UE returns at the eNodeB for which MME has stored information about allocated DL TEIDs for the UE.

Operation 8 of FIG. 3. The MME sends a Modify Bearer Request message (eNodeB address, S1 TEID(s) (downlink DL) for the accepted EPS bearers, Delay Downlink Packet Notification Request, RAT Type) per PDN connection to the Serving GW. If the Serving GW supports Modify Access Bearers Request procedure and if there is no need for the Serving GW to send the signaling to the PGW, the MME may send Modify Access Bearers Request (eNodeB address(es) and TEIDs for downlink user plane for the accepted EPS bearers, Delay Downlink Packet Notification Request) per UE to the Serving GW to improve/optimize the signaling. The Serving GW is now able to transmit downlink data towards the UE.SGW considers UE being in Connected state.

Operation 9 of FIG. 3. SGW provides as response to step 7.

Operation 10 of FIG. 3. MME acks step 7.

Actions at RRC and PDCP at resume/suspend will now be discussed.

RLC entities are kept during RRC suspend/resume for SRBs and DRBs, respectively.

In order for all RLC SDUs (Service Data Units) already received in DL to be forwarded to higher layers and that the internal state of the RLC entity is reset it is proposed to re-establish the RLC entities for all SRBs and DRBs before RRC is suspended.

At RRC resume the RLC and PDCP entities are re-established. Further, it is proposed to re-establish PDCP entities for all SRBs and DRBs, and to restore the RLC entities for all SRBs and DRBs. The reason for not doing RLC re-establishment at resume is because it is proposed to instead be done at suspend, as mentioned above. Restore means that the resume context, which was used before RRC suspend, is used to resume the connections.

In case of a need to reconfigure some aspect(s) of, e.g., RBs which may not be reconfigured with the RRC Connection Resume message itself, the reconfiguration may be done with a RRC Connection Reconfiguration message (e.g., multiplexed with RRC Connection Resume in Msg4). In case reconfiguration is done with an RRC Connection Reconfiguration message subsequent to resuming the RRC connection with RRC Connection Resume, there is a risk that new data appears in RBs, using a configuration which is incorrect or not supported in the eNB where the connection is resumed, before the RBs have been reconfigured. Such new data may be lost, or may cause malfunction or unexpected behavior if the agreed procedure for suspend is assumed.

RBs may/should be suspended when the RRC connection is suspended and resumed when the RRC connection is resumed. While RBs are suspended, new data will not be processed.

FIG. 4A illustrates operations of suspending and resuming an RRC connection. Responsive to an RRC connection suspend message from base station eNB at operation 401, wireless terminal UE may suspend radio bearers RBs at operation 403 and suspend the RRC connection at operation 405. Responsive to arrival of uplink UL data at operation 407, wireless terminal UE may transmit an RRC connection resume request message to base station eNB at operation 409, and base station eNB may transmit an RRC connection resume message to wireless terminal UE at operation 411. In response, wireless terminal UE may perform reconfiguration at operation 413, change keys and resume security at operation 415, and resume radio bearers RBs which are suspended at operation 417. Wireless terminal UE may then transmit an RRC connection resume complete message at operation 419, and wireless terminal UE may transmit uplink data on the radio bearer RB at operation 421.

For the case that reconfiguration of RB(s) is to be done with an RRC Connection Reconfiguration message subsequent to resuming the RRC connection with RRC Connection Resume:

an indication may be added in RRC Connection Resume indicating that RBs should not be resumed yet; i.e., wait and resume suspended RBs after processing of the RRC Connection Reconfiguration message. RBs are reconfigured with a RRC Connection Reconfiguration message (e.g., multiplexed with RRC Connection Resume in Msg4).

Figure 4B:
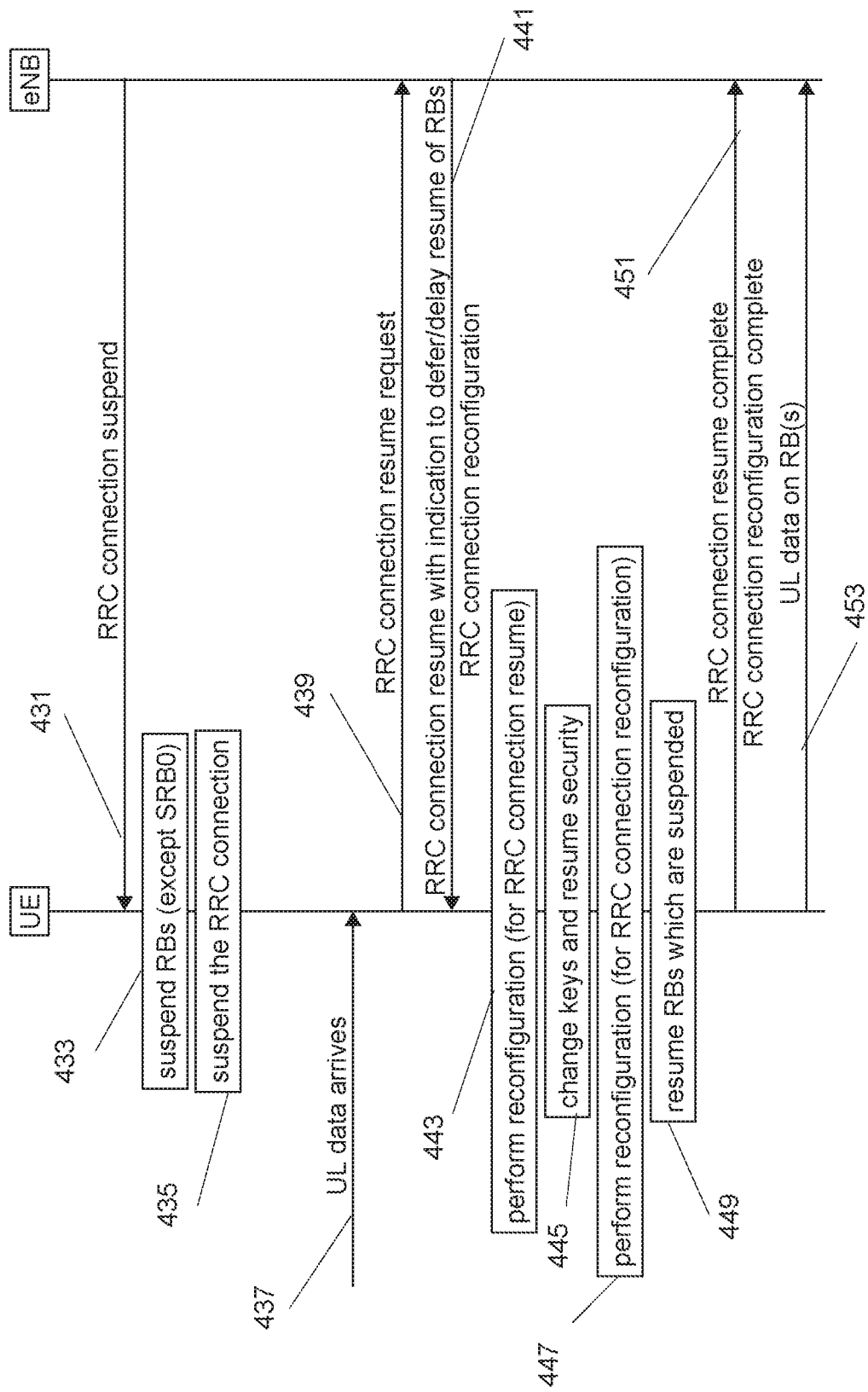

FIG. 4B illustrates RRC Connection Reconfiguration multiplexed in same transmission as RRC Connection Resume. Responsive to an RRC connection suspend message from base station eNB at operation 431, wireless terminal UE may suspend radio bearers RBs at operation 433 and suspend the RRC connection at operation 435. Responsive to arrival of uplink UL data at operation 437, wireless terminal UE may transmit an RRC connection resume request message to base station eNB at operation 439, and base station eNB may transmit an RRC connection resume message (with indication to defer/delay resume of RBs RRC connection reconfiguration) to wireless terminal UE at operation 441. In response, wireless terminal UE may perform reconfiguration (for RRC connection resume) at operation 443, change keys and resume security at operation 445, perform reconfiguration (for RRC connection reconfiguration) at operation 447, and resume radio bearers RBs which are suspended at operation 449. Wireless terminal UE may then transmit an RRC connection resume complete message at operation 451, and wireless terminal UE may transmit uplink data on the radio bearer RB(s) at operation 453.

The example of FIG. 4B illustrates that RRC connection resume complete and RRC connection reconfiguration complete may be multiplexed in the same transmission/lower layer PDU/transport block. RRC connection resume complete and RRC connection reconfiguration complete may alternatively be sent in separate transmissions/lower layer PDUs/transport blocks. If sent separately the RRC connection resume complete may be sent before or after performing reconfiguration pertaining to RRC connection reconfiguration.

Figure 5:
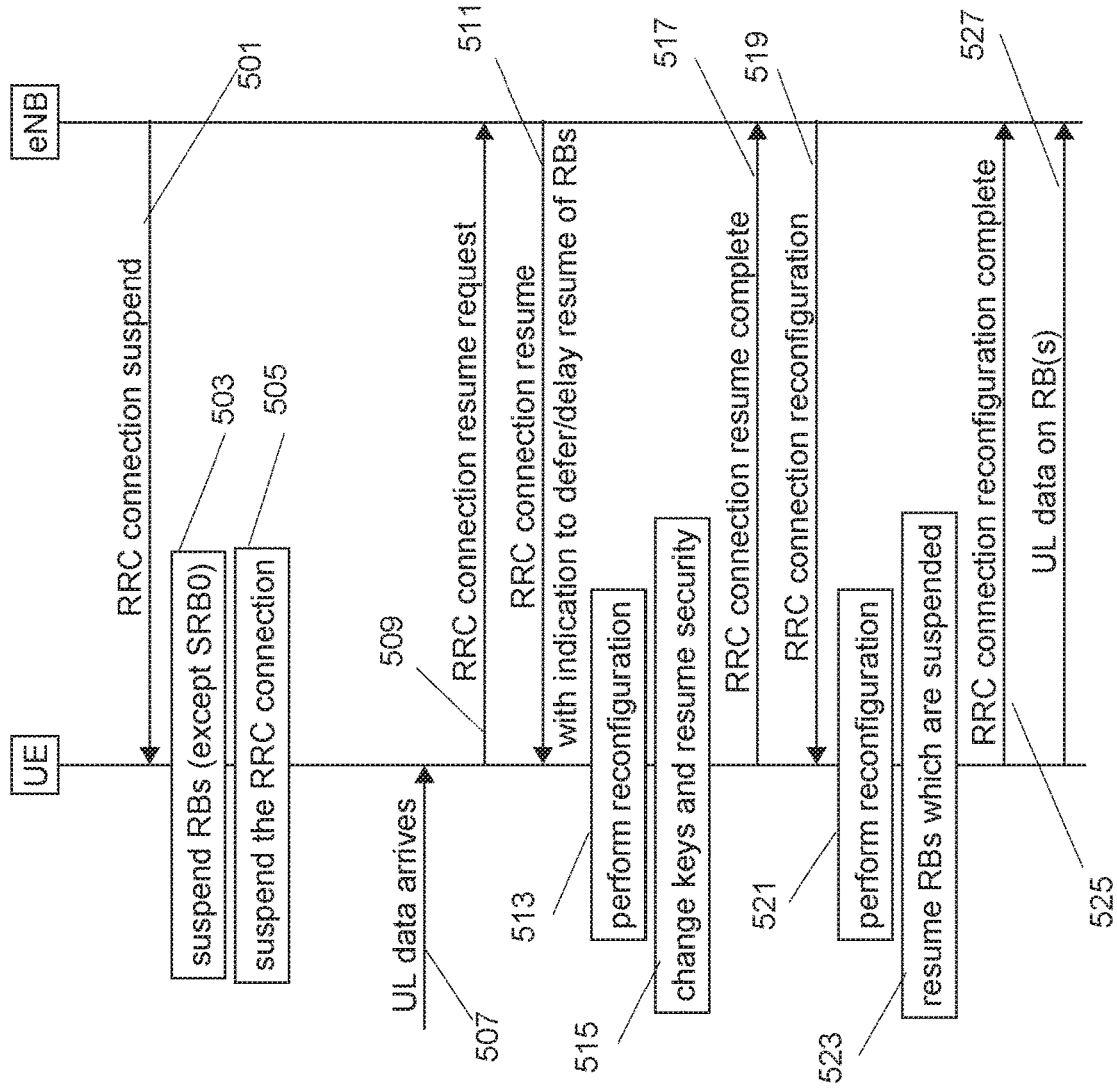

FIG. 5 illustrates operations of RRC Connection Reconfiguration in separate transmission after RRC Connection Resume. Responsive to an RRC connection suspend message from base station eNB at operation 501, wireless terminal UE may suspend radio bearers RBs at operation 503 and suspend the RRC connection at operation 505. Responsive to arrival of uplink UL data at operation 507, wireless terminal UE may transmit an RRC connection resume request message to base station eNB at operation 509, and base station eNB may transmit an RRC connection resume message (with indication to defer/delay resume of RBs) to wireless terminal UE at operation 511. In response, wireless terminal UE may perform reconfiguration at operation 513 and change keys and resume security at operation 515. At operation 517, wireless terminal UE may transmit an RRC connection resume complete message to base station eNB, and at operation 519, base station eNB may transmit an RRC connection reconfiguration message to wireless terminal UE. In response, wireless terminal UE may perform reconfiguration at operation 521, and resume radio bearers RBs which are suspended at operation 523. Wireless terminal UE may then transmit an RRC connection reconfiguration complete message at operation 525, and wireless terminal UE may transmit uplink data on the radio bearer RB(s) at operation 527. The indication can be combined with another indication stating that the RRC Connection Resume Complete message is not needed or should be omitted (due to a pending RRC Connection Reconfiguration message that will signal that the procedure is completed.).

Figure 6:
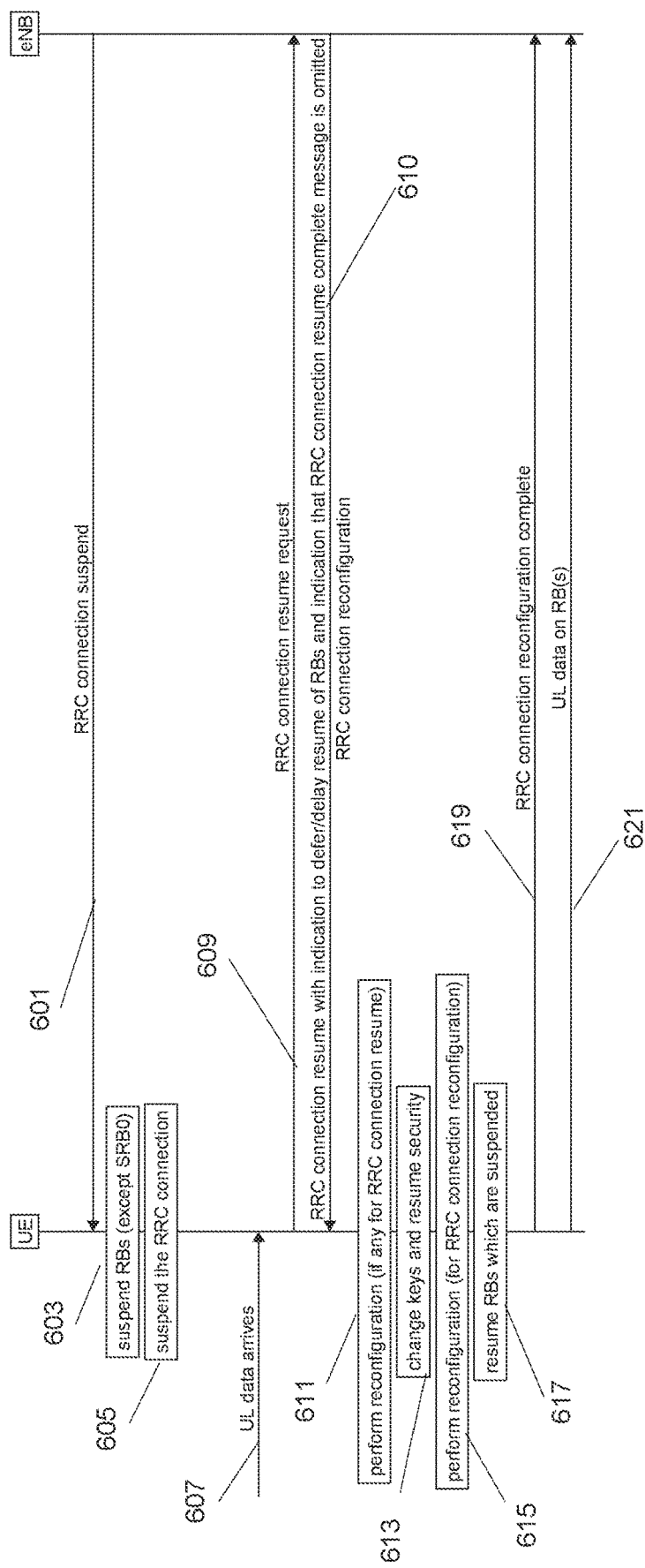
Figure 7:
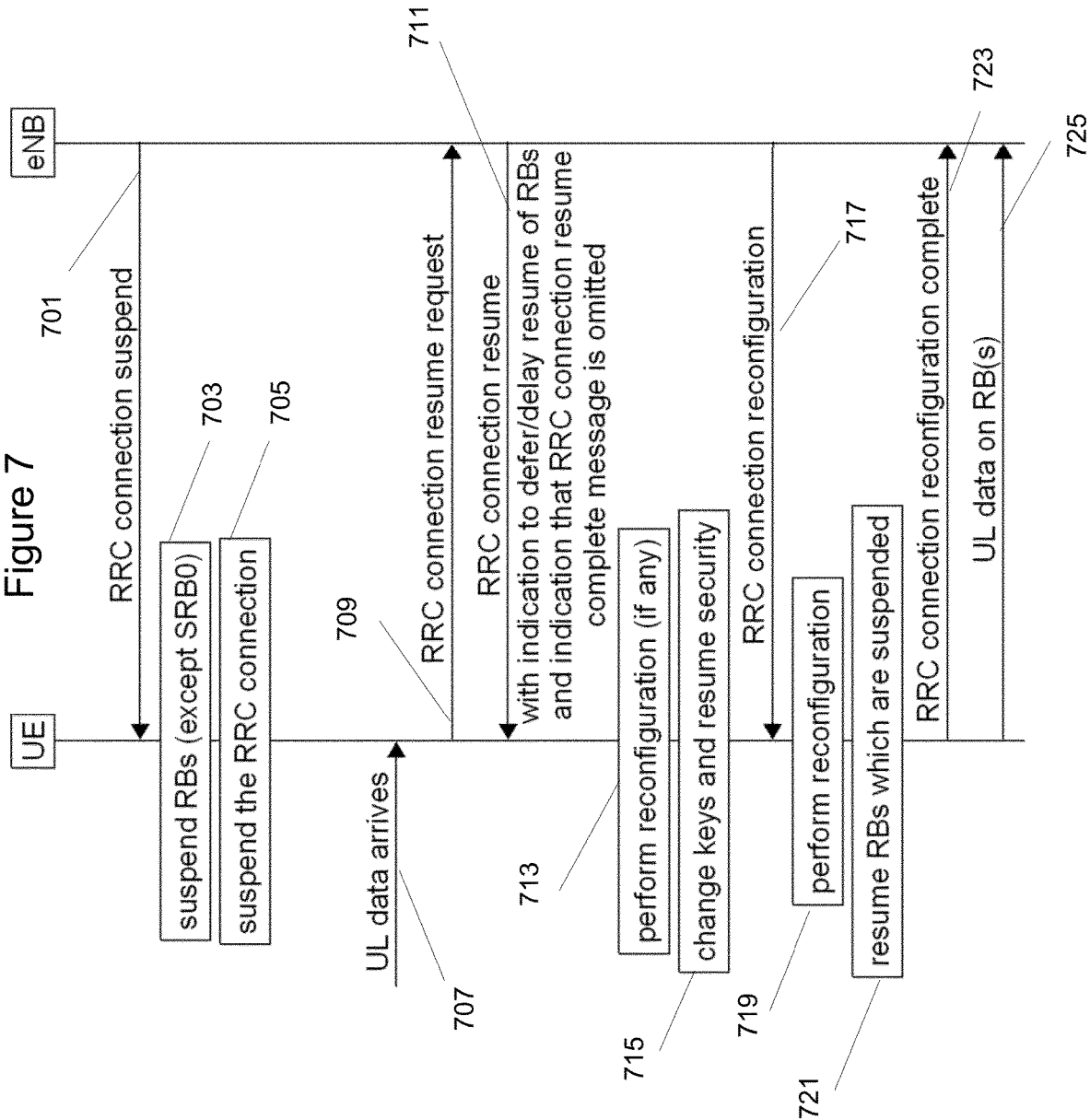

FIG. 6 illustrates Indication to defer/delay resume of RB s combined with indication that RRC connection resume complete message is not needed or omitted; RRC Connection Resume and RRC Connection Reconfiguration may be multiplexed. Responsive to an RRC connection suspend message from base station eNB at operation 601, wireless terminal UE may suspend radio bearers RBs (except SRB0) at operation 603 and suspend the RRC connection at operation 605. Responsive to arrival of uplink UL data at operation 607, wireless terminal UE may transmit an RRC connection resume request message to base station eNB at operation 609, and base station eNB may transmit an RRC connection resume message (with indication to defer/delay resume of RBs and indication that RRC connection resume complete message is omitted RRC connection reconfiguration) to wireless terminal UE at operation 610. In response, wireless terminal UE may perform reconfiguration (if any for RRC connection resume) at operation 611, change keys and resume security at operation 613, perform reconfiguration (for RRC connection reconfiguration) at operation 615, and resume RBs which are suspended at operation 617. At operation 619, wireless terminal UE may transmit an RRC connection reconfiguration complete message, and at operation 621, wireless terminal UE may transmit UL data on RB(s). FIG. 7 illustrates Indication to defer/delay resume of RBs combined with indication that RRC connection resume complete message is not needed or omitted; RRC Connection Resume and RRC Connection Reconfiguration not multiplexed. Responsive to an RRC connection suspend message from base station eNB at operation 701, wireless terminal UE may suspend radio bearers RBs (except SRB0) at operation 703 and suspend the RRC connection at operation 705. Responsive to arrival of uplink UL data at operation 707, wireless terminal UE may transmit an RRC connection resume request message to base station eNB at operation 709, and base station eNB may transmit an RRC connection resume message (with indication to defer/delay resume of RBs and indication that RRC connection resume complete message is omitted) to wireless terminal UE at operation 711. In response, wireless terminal UE may perform reconfiguration (if any) at operation 713, and change keys and resume security at operation 715. At operation 717, wireless terminal UE may receive an RRC connection reconfiguration message from base station eNB. Responsive to the RRC connection reconfiguration message, the wireless terminal UE may perform reconfiguration at operation 719, and resume RBs which are suspended at operation 721. At operation 723, wireless terminal UE may transmit an RRC connection reconfiguration complete message, and at operation 725, wireless terminal UE may transmit UL data on RB(s).

In some embodiments of inventive concepts, the RRC Connection Resume message and the RRC Connection Reconfiguration message may be multiplexed in the same transmission/lower layer PDU/transport block.

In other embodiments of inventive concepts, the RRC Connection Resume message and the RRC Connection Reconfiguration message may be sent in separate transmissions/lower layer PDUs/transport blocks.

RRC Connection Suspend may be an RRCConnectionSuspend message or another message indicating that the RRC connection shall be suspended. In some embodiments of inventive concepts, RRC Connection Suspend may be an RRCConnectionRelease message with a release cause indicating that the connection shall be suspended.

RRC Connection Resume Request may be an RRCConnectionResumeRequest or another message indicating that resumption of an RRC connection is requested.

RRC Connection Resume may be an RRCConnectionResume message or another message indicating that the connection shall be resumed.

RRC Connection Resume Complete may be an RRCConnectionResumeComplete message or another message indicating that the RRC connection has been resumed.

RRC Connection Reconfiguration may be an RRCConnectionReconfiguration message or another message which reconfigures the RRC connection.

According to some embodiments disclosed herein, configuration mismatch between UE and eNB (which may lead to data loss, and/or may cause malfunction and/or unexpected behavior) may be reduced/avoided.

Figure 8:
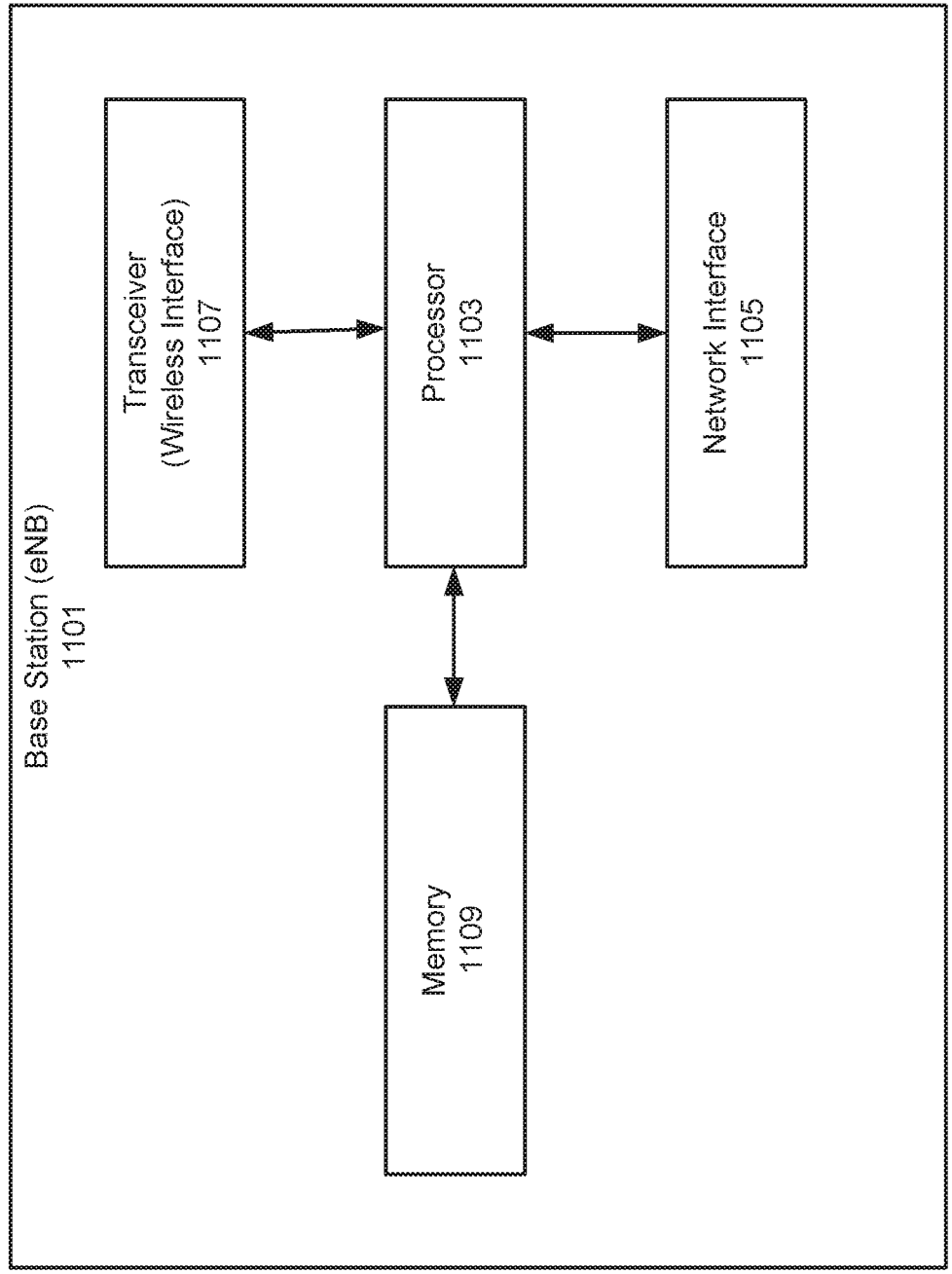
FIG. 8 is a block diagram illustrating a base station eNB according to some embodiments of inventive concepts.

FIG. 8 is a block diagram illustrating a base station 1101 of a wireless communication network according to some embodiments. As shown, base station (eNB) 1101 may include processor 1103 coupled with wireless interface 1107 (also referred to as a transceiver), memory 1109, and network interface 1105, and base station 1101 may be configured to carry out at least some of the respective base station operations/functionalities described herein. Network interface 1105 may be configured to provide network communications with one or more other base stations. Wireless interface 1107 may be configured to provide wireless communications over cells with wireless terminals. Processor 1103 (also referred to as a processor circuit or processing circuitry) may include one or more data processing circuits, such as a general purpose and/or special purpose processor (e.g., microprocessor and/or digital signal processor). Processor 1103 may be configured to execute computer program instructions from functional modules in memory 1109 (also referred to as a memory circuit or memory circuitry), described herein as a computer readable medium, to perform some or all of the operations and/or methods that are described herein for one or more of the examples/embodiments.

Figure 9:
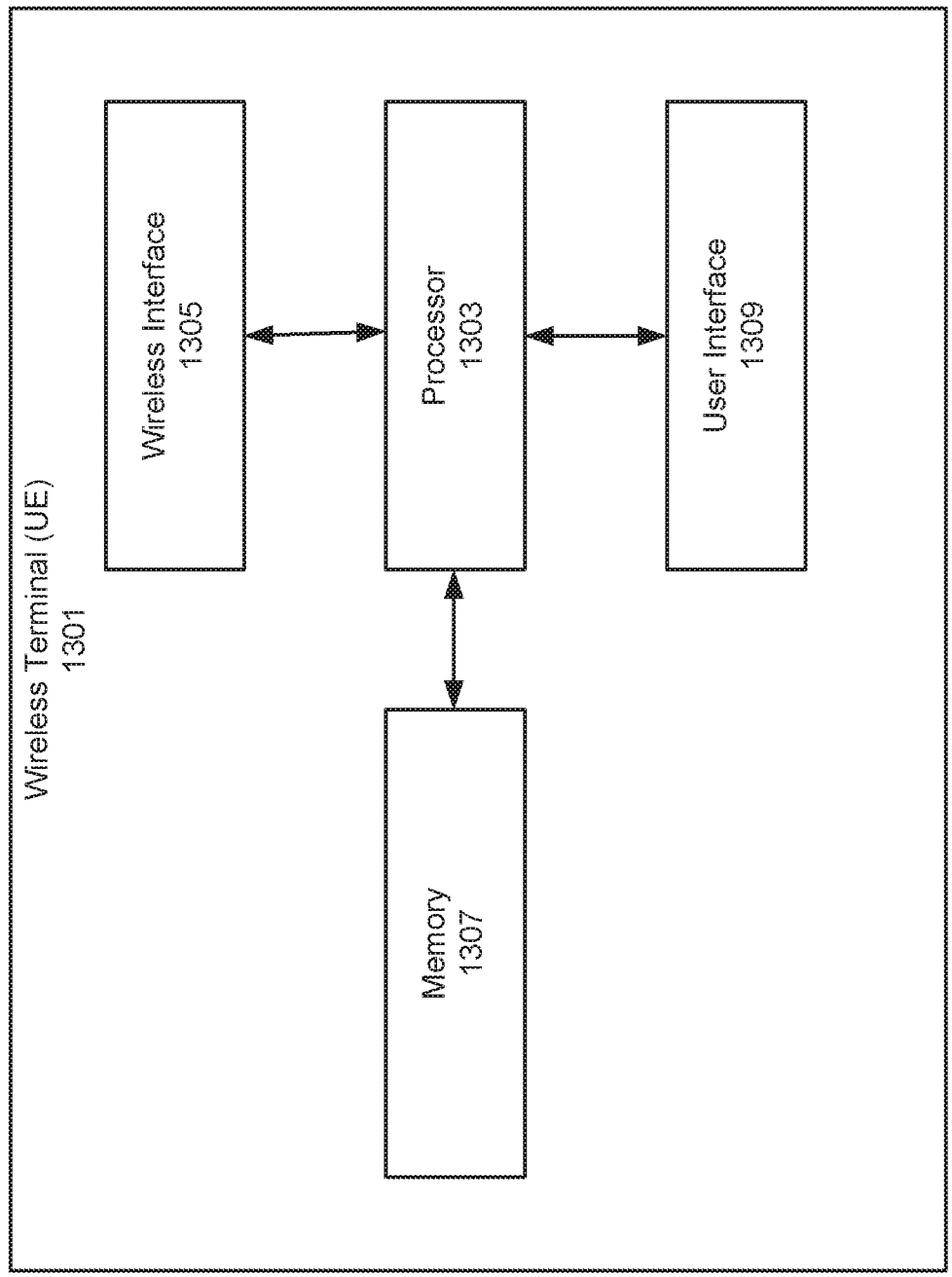
FIG. 9 is a block diagram illustrating a wireless terminal UE according to some embodiments of inventive concepts.

FIG. 9 is a block diagram illustrating a wireless terminal (UE) 1301 that can communicate wirelessly with one or more base stations. As shown, wireless terminal 1301 may include processor 1303 coupled with wireless interface 1305 (also referred to as a transceiver), and memory 1307. Wireless terminal 1301 may also include user interface 1309 (e.g., including a display, a keypad, a touch sensitive display, a microphone, a speaker, one or more buttons, etc.). Wireless terminal 1301 may be configured to carry out at least some of the respective operations/functionality described herein. Wireless interface 1305 may be configured to provide wireless communications with one or more base stations 1101. Wireless interface 1305 may include an LTE transceiver for communication with base stations 1101 of the cellular mobile communication network. Processor 1303 (also referred to as a processor circuit or processing circuitry) may include one or more data processing circuits, such as a general purpose and/or special purpose processor (e.g., microprocessor and/or digital signal processor). Processor 1303 may be configured to execute computer program instructions from functional modules in memory 1307 (also referred to as a memory circuit or memory circuitry), described herein as a computer readable medium, to perform some or all of the operations and/or methods that are described herein for one or more of the examples/embodiments.

Operations of a wireless terminal UE will now be discussed with reference to the flow chart of FIG. 10 and the modules of FIG. 11. For example, modules of FIG. 11 may be stored in wireless terminal memory 1307 of FIG. 9, and these modules may provide instructions so that when the instructions of a module are executed by wireless terminal processor 1303, processor 1303 performs respective operations of the flow chart of FIG. 10.

At block 1001, wireless terminal processor 1303 may provide a connection with the base station eNB through transceiver 1305, for example, using connection provision module 1151. The connection may be a Radio Resource Control (RRC) connection.

At block 1003 after providing the connection with the base station, processor 1303 may receive a connection suspend message from the base station eNB through transceiver 1305, for example, using connection suspend message reception module 1153. The connection suspend message may be a Radio Resource Control (RRC) connection suspend message.

At block 1005, processor 1303 may suspend the radio bearer for the connection responsive to receiving the connection suspend message, for example, using radio bearer suspension module 1155. At block 1007, processor 1303 may suspend the connection after suspending the radio bearer for the connection, for example, using connection suspension module 1157. Suspending the connection may correspond to putting the RRC connection in an RRC inactive state (as an alternative to the UE entering an RRC_IDLE state).

At block 1009, processor 1303 may transmit a connection resume request through transceiver 1305 to the base station eNB of the wireless communication network, for example, using connection resume request transmission module 1159. Processor 1303, for example, may transmit the connection resume request responsive to arrival of uplink data for transmission to the base station. Moreover, processor 1303 may block processing of the uplink data for transmission until after resuming the radio bearer at block 1017. The connection resume request may be a Radio Resource Control (RRC) resume request.

At block 1011 after transmitting the connection resume request, processor 1303 may receive a connection resume message through transceiver 1305 from the base station, for example, using connection resume message reception module 1161. The connection resume message may include an indication to delay resuming the radio bearer. The connection resume message may be a Radio Resource Control (RRC) connection resume message, and the connection resume message may include a security key derivation indicator, for example, including a Next Hop Chaining Counter (NCC).

At block 1013 responsive to receiving the connection resume message, processor 1303 may performing reconfiguration of a connection with the base station, for example, using reconfiguration performance module 1163. Processor 1303 may perform reconfiguration of the connection based on the connection resume message.

At block 1015 responsive to receiving the connection resume message, processor 1303 may provide a security key for the connection with the base station, for example, using security key provision module 1165. Providing the security key may include changing a security key from a previous security key used before receiving the connection suspend message. For example, changing the security key may include changing the security key using a security key derivation indicator (e.g., including a Next Hop Chaining Counter) included in the connection resume message.

At block 1017 responsive to receiving the connection resume message, processor 1303 may resume a radio bearer, for example, using radio bearer resumption module 1167. The radio bearer may include a data radio bearer or a signaling radio bearer. Moreover, the radio bearer may include a plurality of radio bearers.

At block 1019, processor 1303 may transmit a connection resume complete message through transceiver 1305 to the base station, for example, using connection resume complete message transmission module 1169. The connection resume complete message may be a Radio Resource Control connection resume complete message.

At block 1021 after resuming the radio bearer and/or after transmitting the connection resume complete message, processor 1303 may transmit uplink data using the radio bearer, for example, using uplink UL data transmission module 1171. According to some embodiments, UL data and the connection resume complete message may be multiplexed in a same transport block for transmission using the radio bearer. In addition or in an alternative, UL data may be transmitted using the radio bearer after transmitting the connection resume complete message. For example, some UL data and the connection resume complete message may be multiplexed in a same transport block and transmitted using the radio bearer, and additional UL data may be subsequently transmitted in another transport block using the radio bearer. According to another example, the connection resume complete message may be transmitted in a first transport block (without UL data) using the radio bearer, and UL data may then be transmitted in a second transport block using the radio bearer.

Figure 10:
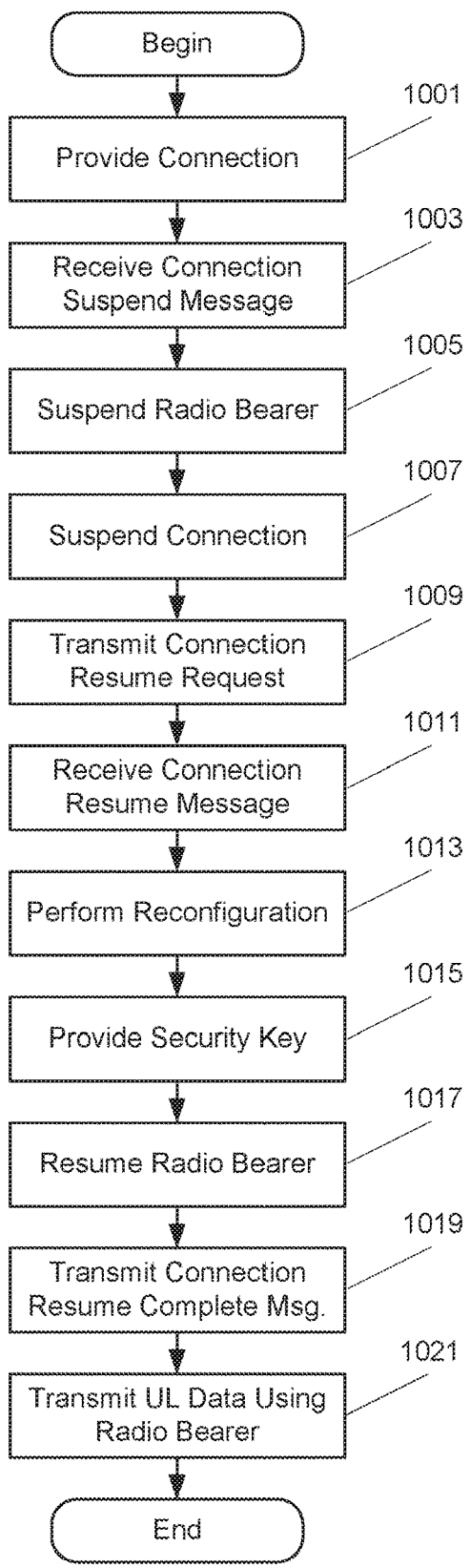
FIG. 10 is a flow chart illustrating operations of a wireless terminal according to some embodiments of inventive concepts.
Figure 11:
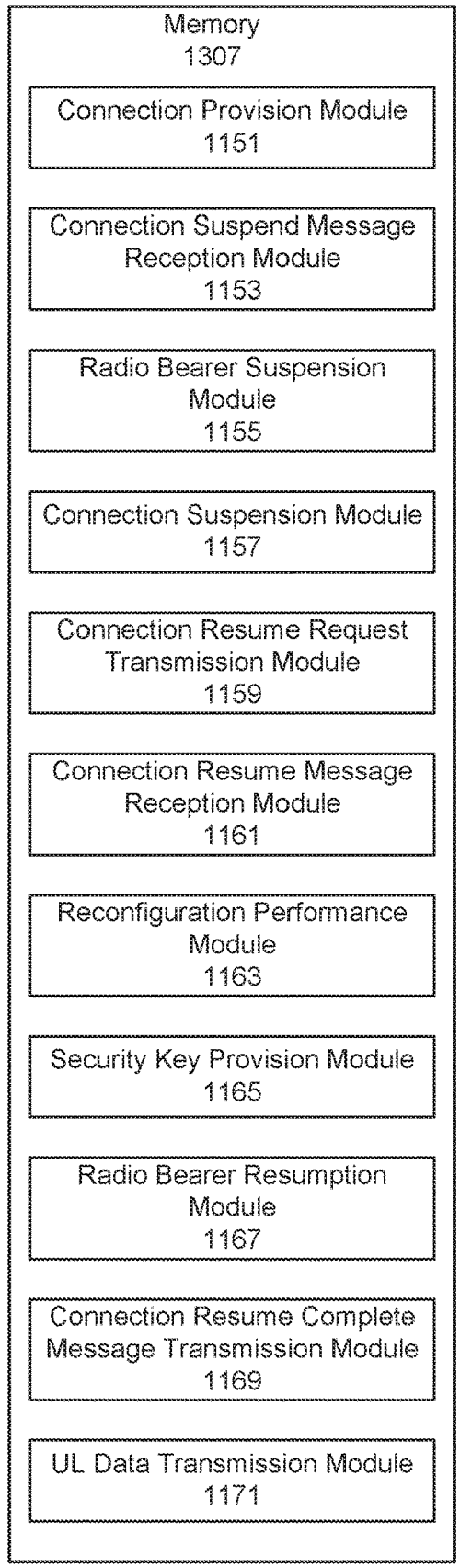
FIG. 11 is a block diagram of memory modules related to operations of FIG. 10 according to some embodiments of inventive concepts.

Various operations of FIG. 10 and/or modules of FIG. 11 may be optional with respect to some embodiments of wireless terminals and related methods. Regarding methods of example embodiment 1 (set forth below), for example, operations of blocks 1001, 1003, 1005, 1007, and 1019 of FIG. 10 may be optional, and regarding related wireless terminals, modules 1151, 1153, 1155, 1157, and 1169 of FIG. 11 may be optional.

Operations of a network node (e.g., a base station) will now be discussed with reference to the flow chart of FIG. 12 and the modules of FIG. 13. For example, modules of FIG. 13 may be stored in network node memory 1109 of FIG. 8, and these modules may provide instructions so that when the instructions of a module are executed by network node processor 1103, processor 1103 performs respective operations of the flow chart of FIG. 12.

At block 1201, processor 1103 may transmit a connection suspend message through transceiver 1107 to a wireless terminal (UE), for example, using connection suspend message transmission module 1351. The connection suspend message may be a Radio Resource Control (RRC) connection suspend message.

After transmitting the connection suspend message, processor 1103 may receive a connection resume request from the wireless terminal UE through transceiver 1107 at block 1203, for example, using connection resume request reception module 1353. The connection resume request may be an RRC connection resume request.

Responsive to receiving the connection resume request, processor 1103 may transmit a connection resume message through transceiver 1107 to the wireless terminal UE at block 1205, for example, using connection resume message transmission module 1355. The connection resume message may include an indication to delay resuming a radio bearer of the connection. The connection resume message may also include an indication to omit a connection resume complete message. The connection resume message may be an RRC connection resume message.

At block 1207, processor 1103 may receive uplink UL data from the wireless terminal UE through transceiver 1107 using the radio bearer, for example, using UL data reception module 1357. The radio bearer, for example, may include a data radio bearer or a signaling radio bearer. Moreover, the radio bearer may include a plurality of radio bearers.

Various operations of FIG. 12 and/or modules of FIG. 13 may be optional with respect to some embodiments of network nodes and related methods. Regarding methods of example embodiment 35 (set forth below), for example, operations of block 1207 of FIG. 12 may be optional, and regarding related termination nodes, module 1357 of FIG. 13 may be optional.

EXAMPLE EMBODIMENTS

Embodiment 1. A method of operating a wireless terminal in a wireless communication network, the method comprising: transmitting a connection resume request from the wireless terminal to a base station of the wireless communication network; after transmitting the connection resume request, receiving a connection resume message at the wireless terminal from the base station; responsive to receiving the connection resume message, performing reconfiguration of a connection with the base station; responsive to receiving the connection resume message, providing a security key for the connection with the base station; responsive to receiving the connection resume message, resuming a radio bearer; and after resuming the radio bearer, transmitting uplink data using the radio bearer.

Embodiment 2. The method of Embodiment 1, further comprising: transmitting a connection resume complete message from the wireless terminal to the base station, wherein transmitting the uplink data comprises transmitting the uplink data after transmitting the connection resume complete message.

Embodiment 3. The method of any of Embodiments 1-2 wherein the connection resume message includes an indication to delay resuming the radio bearer, and wherein performing reconfiguration comprises performing reconfiguration of the connection based on the connection resume message.

Embodiment 4. The method of Embodiment 3, further comprising: after transmitting the connection resume request, receiving a connection reconfiguration message; and responsive to receiving the connection reconfiguration message and after providing the security key, performing reconfiguration of the connection based on the connection reconfiguration message, wherein resuming the radio bearer comprises resuming the radio bearer after performing reconfiguration based on the connection reconfiguration message responsive to the indication to delay resuming the radio bearer.

Embodiment 5. The method of Embodiment 4 wherein performing reconfiguration based on the connection reconfiguration message comprises decrypting the connection reconfiguration message using the security key.

Embodiment 6. The method of any of Embodiments 4-5 wherein the connection resume message and the connection reconfiguration message are separately received using different Protocol Data Units.

Embodiment 7. The method of any of Embodiments 4-5 wherein the connection resume message and the connection reconfiguration message are multiplexed on a same Protocol Data Unit.

Embodiment 8. The method of Embodiment 7 wherein the same Protocol Data Unit is a Medium Access Control Protocol Data Unit.

Embodiment 9. The method of any of Embodiments 4-8 wherein performing reconfiguration based on the connection resume message and/or providing the security key occur after receiving the connection reconfiguration message.

Embodiment 10. The method of any of Embodiments 4-6 wherein performing reconfiguration based on the connection resume message and/or providing the security key occur before receiving the connection reconfiguration message.

Embodiment 11. The method of any of Embodiments 1-10 further comprising: after resuming the radio bearer, transmitting a connection reconfiguration complete message from the wireless terminal to the base station, wherein transmitting the uplink data comprises transmitting the uplink data after transmitting the connection reconfiguration complete message.

Embodiment 12. The method of Embodiment 11, further comprising: after resuming the radio bearer, transmitting a connection resume complete message from the wireless terminal to the base station, wherein transmitting the uplink data comprises transmitting the uplink data after transmitting the connection resume complete message.

Embodiment 13. The method of Embodiment 12 wherein the connection resume complete message and the connection reconfiguration complete message are multiplexed on a same Protocol Data Unit.

Embodiment 14. The method of Embodiment 13 wherein the same Protocol Data Unit is a Medium Access Control Protocol Data Unit.

Embodiment 15. The method of Embodiment 12 wherein the connection resume complete message and the connection reconfiguration complete message are separately transmitted using different Protocol Data Units.

Embodiment 16. A method of Embodiment 1, wherein the connection resume message includes an indication to delay resuming the radio bearer, wherein performing reconfiguration comprises performing reconfiguration based on the connection resume message, wherein providing the security key comprises providing the security key based on the connection resume message, the method further comprising: after performing reconfiguration based on the connection resume message and/or after providing the security key, receiving a connection reconfiguration message at the wireless terminal from the base station; and performing reconfiguration of the connection based on the connection reconfiguration message; wherein resuming the radio bearer comprises resuming the radio bearer responsive to performing reconfiguration based on the connection reconfiguration message.

Embodiment 17. The method of Embodiment 16, further comprising: after performing reconfiguration based on the connection resume message and/or after providing the security key, transmitting a connection resume complete message from the wireless terminal to the base station; wherein receiving the connection reconfiguration message comprises receiving the connection reconfiguration message after transmitting the connection resume complete message.

Embodiment 18. A method according to Embodiment 1 wherein the connection resume message includes a first indication to delay resuming the radio bearer and a second indication to omit a connection resume complete message, wherein performing reconfiguration comprises performing reconfiguration of the connection based on the connection resume message, the method further comprising: after transmitting the connection resume request, receiving a connection reconfiguration message; and responsive to receiving the connection reconfiguration message and after providing the security key, performing reconfiguration of the connection based on the connection reconfiguration message, wherein resuming the radio bearer comprises resuming the radio bearer after performing reconfiguration based on the connection reconfiguration message responsive to the indication to delay resuming the radio bearer; after resuming the radio bearer, transmitting a connection reconfiguration complete message from the wireless terminal to the base station, wherein transmitting the uplink data comprises transmitting the uplink data after transmitting the connection reconfiguration complete message.

Embodiment 19. The method of Embodiment 18 wherein the connection reconfiguration message is received before providing the security key.

Embodiment 20. The method of Embodiment 18 wherein the connection reconfiguration message is received after providing the security key.

Embodiment 21. The method of any of Embodiments 1-20, further comprising: before transmitting the connection resume request, providing a connection with the base station; before transmitting the resume request and after providing the connection with the base station, receiving a connection suspend message at the wireless terminal from the base station; before transmitting the connection resume request and responsive to receiving the connection suspend message, suspending the radio bearer for the connection; and before transmitting the connection resume request and after suspending the radio bearer for the connection, suspending the connection.

Embodiment 22. The method of Embodiment 21, wherein transmitting the connection resume request comprises transmitting the connection resume request responsive to arrival of the uplink data for transmission to the base station.

Embodiment 23. The method of Embodiment 22 further comprising: blocking processing of the uplink data for transmission until after resuming the radio bearer.

Embodiment 24. The method of any of Embodiments 21-23 wherein the connection suspend message comprises a Radio Resource Control connection suspend message, Embodiment 25. The method of any of Embodiments 1-24, wherein the connection resume request comprises a Radio Resource Control resume request, wherein the connection resume message comprises a Radio Resource Control connection resume message, wherein the connection comprises a Radio Resource Control connection, and wherein the connection resume complete message comprises a Radio Resource Control connection resume complete message.

Embodiment 26. The method of any of Embodiments 1-25, wherein providing the security key comprises changing a security key from a previous security key used before receiving the connection suspend message.

Embodiment 27. The method of any of Embodiments 1-26 wherein the connection resume message includes a security key derivation indicator, and wherein changing the security key comprises changing the security key using the security key derivation indicator.

Embodiment 28. The method of Embodiment 27 wherein the security key derivation indicator comprises a Next Hop Chaining Counter (NCC).

Embodiment 29. The method of any of Embodiments 1-28 wherein the radio bearer comprises a data radio bearer.

Embodiment 30. The method of any of Embodiments 1-28 wherein the radio bearer comprises a signaling radio bearer.

Embodiment 31. The method of any of Embodiments 1-30 wherein the radio bearer comprises a plurality of radio bearers.

Embodiment 32. A wireless terminal (UE) comprising: a transceiver configured to provide wireless communication with a wireless communication network; and a processor coupled with the transceiver, wherein the processor is configured to perform operations of any of Embodiments 1-31, and wherein communications between the processor and the wireless communication network are provided through the transceiver.

Embodiment 33. A wireless terminal (UE) adapted to perform operations according to any of Embodiments 1-31.

Embodiment 34. A wireless terminal (UE) comprising modules adapted to perform operations according to any of Embodiments 1-31.

Embodiment 35. A method of operating a node of a wireless communication network, the method comprising: transmitting a connection suspend message from the node to a wireless terminal; after transmitting the connection suspend message, receiving a connection resume request at the node from the wireless terminal; responsive to receiving the connection resume request, transmitting a connection resume message from the node to the wireless terminal, wherein the connection resume message includes an indication to delay resuming a radio bearer of the connection.

Embodiment 36. The method of Embodiment 35 wherein the connection resume message includes an indication to omit a connection resume complete message.

Embodiment 37. The method of any of Embodiments 35-36 wherein the connection suspend message is a Radio Resource Control (RRC) connection suspend message, wherein the connection resume request is an RRC connection resume request, and wherein the connection resume message is an RRC connection resume message.

Embodiment 38. The method of any of Embodiments 35-37, wherein the node is a base station of the wireless communication network.

Embodiment 39. The method of any of Embodiments 35-38 wherein the radio bearer comprises a data radio bearer.

Embodiment 40. The method of any of Embodiments 35-38 wherein the radio bearer comprises a signaling radio bearer.

Embodiment 41. The method of any of Embodiments 35-40 wherein the radio bearer comprises a plurality of radio bearers.

Embodiment 42. A node of a wireless communication network, the node comprising: a transceiver configured to provide wireless communication with a wireless terminal; and a processor coupled with the transceiver, wherein the processor is configured to perform operations of any of Embodiments 35-41, and wherein communications between the processor and the wireless terminal are provided through the transceiver.

Embodiment 43. A node of a wireless communication network, wherein the node is adapted to perform operations according to any of Embodiments 35-41.

Embodiment 44. A node of a wireless communication network, wherein the node comprises modules adapted to perform operations according to any of Embodiments 35-41.

Abbreviations:
UP User Plane
AS Access Stratum
NAS Non-Access Stratum
EPS Evolved Packet System
TEID Tunnel Endpoint Identifier
S1-AP S1 Application Protocol
ECM EPS Connection Management
SRB0 Signaling Radio Bearer 0 (zero)
CCCH Common Control Channel
SRB Signaling Radio Bearer
DRB Data Radio Bearer
PDCP Packet Data Convergence Protocol
K_eNB key used for AS security Further Definitions:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method for a wireless terminal (UE) configured to operate in a wireless communication network that includes a base station, the method comprising:
    transmitting, to the base station, a request to resume a suspended connection with the wireless communication network;
    subsequently receiving, from the base station, a connection resume message;
    performing configuration of the connection based on the connection resume message,
        wherein performing the configuration comprises changing a security key previously used for the connection before the connection was suspended;
    resuming a suspended radio bearer associated with the connection; and
    selectively transmitting, to the base station, a connection resume complete message.

2. The method of claim 1, wherein:
    the connection resume message includes a security key derivation indicator; and
    changing the security key is based on the security key derivation indicator.

3. The method of claim 1, wherein the connection resume message includes a first indication to delay resuming the suspended radio bearer until receipt of a connection reconfiguration message.

4. The method of claim 3, further comprising receiving the connection reconfiguration message from the base station, wherein resuming the suspended radio bearer is responsive to the connection reconfiguration message.

5. The method of claim 4, wherein the connection reconfiguration message is multiplexed in the same transmission from the base station as the connection resume message.

6. The method of claim 4, wherein the connection reconfiguration message is received separate from and after the connection resume message.

7. The method of claim 1, wherein:
    the connection resume message includes a second indication of whether the wireless terminal should transmit a responsive connection resume complete message; and
    selectively transmitting the connection resume complete message is based on the second indication.

8. The method of claim 1, wherein selectively transmitting the connection resume message comprises transmitting the connection resume complete message when the connection resume message does not include a second indication of whether the wireless terminal should transmit a responsive connection resume complete message.

9. The method of claim 1, further comprising transmitting uplink data using the resumed radio bearer.

10. A wireless terminal (UE) configured to operate in a wireless communication network that includes a base station, the UE comprising:
    a transceiver configured to communicate with the base station; and
    processing circuitry operably coupled with the transceiver, whereby the processing circuitry and the transceiver are configured to:
        transmit, to the base station, a request to resume a suspended connection with the wireless communication network;
        subsequently receive, from the base station, a connection resume message;
        perform configuration of the connection based on the connection resume message,
            wherein performing the configuration comprises changing a security key previously used for the connection before the connection was suspended;
        resume a suspended radio bearer associated with the connection; and
        selectively transmit, to the base station, a connection resume complete message.

11. The wireless terminal of claim 1, wherein:
    the connection resume message includes a security key derivation indicator; and
    the processing circuitry is further configured to change the security key based on the security key derivation indicator.

12. The wireless terminal of claim 10, wherein the connection resume message includes a first indication to delay resuming the suspended radio bearer until receipt of a connection reconfiguration message.

13. The wireless terminal of claim 12, wherein the processing circuitry and the transceiver are further configured to:
    receive the connection reconfiguration message from the base station; and
    resume the suspended radio bearer responsive to the connection reconfiguration message.

14. The wireless terminal of claim 13, wherein the connection reconfiguration message is received in the same transmission from the base station as the connection resume message.

15. The wireless terminal of claim 13, wherein the connection reconfiguration message is received separate from and after the connection resume message.

16. The wireless terminal of claim 10, wherein:
    the connection resume message includes a second indication of whether the wireless terminal should transmit a responsive connection resume complete message; and the processing circuitry and the transceiver are configured to selectively transmit the connection resume complete message based on the second indication.

17. The wireless terminal of claim 10, wherein the processing circuitry and the transceiver are configured to selectively transmit the connection resume message based on transmitting the connection resume complete message when the connection resume message does not include a second indication of whether the wireless terminal should transmit a responsive connection resume complete message.

18. The wireless terminal of claim 10, wherein the processing circuitry and the transceiver are further configured to transmit uplink data using the resumed radio bearer.

19. A method for a base station configured to operate in a wireless communication network, the method comprising:
 receiving, from a wireless terminal (UE), a request to resume a suspended connection with the wireless communication network;
 subsequently transmitting, to the wireless terminal, a connection resume message including one or more of the following:
  a security key derivation indicator,
  a first indication for the wireless terminal to delay resuming the suspended radio bearer until receipt of a connection reconfiguration message,
  the connection reconfiguration message, and
  a second indication of whether the wireless terminal should transmit a responsive connection resume complete message; and
 selectively receiving, from the wireless terminal, a connection resume complete message.

20. A base station configured to operate in a wireless communication network, the base station comprising:
 a transceiver configured to communicate with one or more wireless terminals (UEs); and
 processing circuitry operably coupled with the transceiver, whereby the processing circuitry and the transceiver are configured to perform operations corresponding to the method of claim 19.

* * * * *